US012708961B2

(12) United States Patent
Rambusch et al.

(10) Patent No.: US 12,708,961 B2
(45) Date of Patent: Aug. 18, 2026

(54) METHOD AND APPARATUS FOR MAKING ADHESIVE TAPE

(71) Applicants: Peter Rambusch, Wuppertal (DE); Rene Rambusch, Wuppertal (DE); Kay Ruhnau, Remscheid (DE); Timo Leermann, Wuppertal (DE)

(72) Inventors: Peter Rambusch, Wuppertal (DE); Rene Rambusch, Wuppertal (DE); Kay Ruhnau, Remscheid (DE); Timo Leermann, Wuppertal (DE)

(73) Assignee: CERTOPLAST TECHNISCHE KLEBEBAENDER GMBH, Wuppertal (DE)

( * ) Notice: Subject to any disclaimer, the term of this patent is extended or adjusted under 35 U.S.C. 154(b) by 308 days.

(21) Appl. No.: 17/685,576

(22) Filed: Mar. 3, 2022

(65) Prior Publication Data

US 2023/0278142 A1 Sep. 7, 2023

(30) Foreign Application Priority Data

Mar. 5, 2021 (EP) .................................... 21161079

(51) Int. Cl.

| | |
|---|---|
| ***B23K 26/38*** | (2014.01) |
| ***B05D 5/10*** | (2006.01) |
| ***B23K 26/035*** | (2014.01) |
| ***B23K 26/08*** | (2014.01) |
| ***C09J 7/25*** | (2018.01) |
| *B23K 101/16* | (2006.01) |

(52) U.S. Cl.

CPC ................ *B23K 26/38* (2013.01); *B05D 5/10* (2013.01); *B23K 26/035* (2015.10); *B23K 26/083* (2013.01); *C09J 7/25* (2018.01); *B23K 2101/16* (2018.08); *C09J 2477/006* (2013.01)

(58) Field of Classification Search

CPC ................ B65H 2301/4184; B65H 2301/5113

See application file for complete search history.

(56) References Cited

U.S. PATENT DOCUMENTS

| | | | | |
|---|---|---|---|---|
| 4,645,900 A * | 2/1987 | Heyden | B23K 26/0673 219/121.67 |
| 7,615,128 B2 | 11/2009 | Mikkelsen | |
| 10,766,101 B2 | 9/2020 | Rambusch | |
| 2007/0234862 A1 | 10/2007 | Mikkelsen | |
| 2014/0141159 A1* | 5/2014 | Meier | C09J 7/20 427/207.1 |
| 2017/0066614 A1* | 3/2017 | Allen | B31D 1/0062 |
| 2020/0368846 A1* | 11/2020 | Matsuo | B23K 26/38 |
| 2021/0245984 A1* | 8/2021 | Casarrubias | C08G 18/4236 |

* cited by examiner

*Primary Examiner* — Austin Murata

(74) *Attorney, Agent, or Firm* — Andrew Wilford

(57) ABSTRACT

A method of making adhesive tape has the steps of advancing a substrate band longitudinally in a machine direction from a supply to an array of laser units, cutting the band longitudinally with the laser units into a plurality of longitudinal strips, and then cutting each of the longitudinal strips longitudinally into a plurality of tapes. An adhesive is applied to a face of each of the tapes, and the tapes are wound up individually.

13 Claims, 3 Drawing Sheets

4 1-3 - 5 1-3
Lasers
1
2
3
6
10
11
20
MR 6
7
9
1
8 1
8 2
8 3
7'
Q
B
L
MR

4
$4_1$
$4_2$
$4_3$
5
$5_1$
$5_2$
$5_3$
1
MR
2

4
$4_1$
$4_2$
$5_1$
15
14
$5_2$
$5_3$
5

METHOD AND APPARATUS FOR MAKING ADHESIVE TAPE

FIELD OF THE INVENTION

The present invention relates to adhesive tape. More particularly this invention concerns a method of and apparatus for making adhesive tape.

BACKGROUND OF THE INVENTION

Typically, adhesive tapes are manufactured in such a way that a textile substrate tape equipped with an adhesive coating is fed from the supply unit to a cutter. The cutter is equipped with rotating knives, for example, so that in this way the substrate band is cut into the individual adhesive tapes that are then rolled up individually and finished further. Such a procedure is used, among other things and quite generally, in the prior art according to U.S. Pat. No. 10,766,101.

In addition, however, the prior art also basically already proceeds in such a way that the cutting of the individual adhesive tapes from the substrate band can be carried out with the aid of an ultrasonic or laser unit, as is generally described in the above-mentioned generic publication. In this context, a laser unit has the fundamental advantage that, for example, changing the adhesive tape to be made up or varying its width does not require any complex adjustment measures as is the case with rotating knives. This is because corresponding mechanical adjustments are not needed since with a laser unit the setting can be changed without mechanical intervention.

Within the scope of the likewise relevant prior art according to US 2007/0234862, a laser is used not only to create cuts in the longitudinal direction, but also to create any desired cutting pattern. For this purpose, the laser is connected to an X/Y adjuster working like a plotter.

The state of the art has proven itself in principle, but reaches its limits when a large number of adhesive tapes are to be produced from a single substrate band. In addition, it has not yet been possible to achieve sufficient production speeds in practice to make competitively priced adhesive tapes using this technology.

OBJECTS OF THE INVENTION

It is therefore an object of the present invention to provide an improved method and apparatus for making adhesive tape.

Another object is the provision of such an improved method and apparatus for making adhesive tape that overcomes the above-given disadvantages, in particular such that overall production speed is increased compared to previous approaches and thus competitive products are available.

SUMMARY OF THE INVENTION

A method of making adhesive tape has according to the invention the steps of advancing a substrate band longitudinally in a machine direction from a supply to an array of laser units, cutting the band longitudinally with the laser units into a plurality of longitudinal strips, and then cutting each of the longitudinal strips longitudinally into a plurality of tapes. An adhesive is applied to a face of each of the tapes, normally to the band before cutting. Finally the tapes are wound up individually. Thus a generic method within the scope of the invention is characterized in that several laser units are provided that create the respective adhesive tapes in individual longitudinal strips of the substrate band.

First of all and explicitly, the invention does not resort to a (single) laser unit, as the prior art in this context teaches and specifies. Instead, multiple laser units are used, i.e. two or more laser units. This basically allows the production speed to be increased. Surprisingly, all this also succeeds against the background that laser units are typically expensive.

However, the invention has recognized that the use of two or more laser units, with a correspondingly wide substrate band, opens up the possibility of making a variety of adhesive tapes using multiple laser units cutting simultaneously and in parallel. This increased production speed compensates for the initially high investment costs, which was generally not to be expected.

The chosen approach of the invention is still in line with the advantage of the laser unit in that the widths of the adhesive tapes produced in this way can be varied quickly and easily. For this purpose, it is generally only necessary to control a beam deflector that creates the respective longitudinal cut in a different way. This is usually done with the aid of a programmable controller. In this way, it is even possible to cut adhesive tapes of different widths from the substrate band in one go and in the longitudinal direction of the machine. As a result, the process according to the invention is not only characterized by increased production speed compared to the state of the art, but also allows adhesive tapes of practically any width to be produced at the same time as required, which can be optimally adapted to demand. Special flexibility is thus provided with regard to the respective quantities produced.

It is understood that in principle adhesive tapes of different widths can be made from each of the longitudinal strips. In addition, it is also conceivable to make adhesive tapes of the same width in the longitudinal strip, and adhesive tapes of different widths can be produced from longitudinal strip to longitudinal strip. The longitudinal strip is treated by the respective laser unit and corresponds to a strip of the substrate band of a predetermined width and extending in the longitudinal direction.

In most cases, the procedure is such that the individual longitudinal strips abut each other transversely without spacing. In principle, however, the individual longitudinal strips of each laser unit can also run at a spacing from one another in the longitudinal direction or machine direction of the substrate band. Provided that the longitudinal strips transversely abut one another without spacing, they generally extend over the entire width of the substrate band and cover it practically completely.

In addition, it is usually the case that several adhesive tapes are cut in each longitudinal strip with the aid of the respective laser unit. For example, it is conceivable that with the respective laser unit for example three to ten adhesive tapes can be produced in the longitudinal strip. If, for example, three laser units are used at this point, thirty adhesive tapes can be produced in parallel in this way and at the same time. Of course, this only applies by way of example and also depends on the width of the substrate band from the supply. In most cases, the roll width (relative to the parent roll) is assumed to be at least 350 mm.

As already explained, the adhesive tapes are generally cut with identical widths in the respective longitudinal strips by the respective laser unit. Of course, it is also possible to work with different widths in the longitudinal strips. Likewise, it is within the scope of the invention to make adhesive tapes with identical widths in the longitudinal strip and the width can be varied from longitudinal strip to longitudinal strip. In addition, it is usually the case that the substrate band is divided in the transverse direction into longitudinal strips of the same width. Just as well, of course, it is also possible to use longitudinal strips of different widths in the transverse direction.

In this way, a large number of adhesive tapes are produced from the substrate band by the described longitudinal cuts. The individual adhesive tapes can then be rolled up. In general, it is conceivable that the substrate band is equipped with the adhesive coating from the outset. For this purpose, the adhesive coating may be applied to the entire surface of the substrate band. In principle, of course, stripes of coating are also possible.

Furthermore, it is within the scope of the invention to cut an uncoated substrate band into the individual adhesive tapes with the aid of the laser unit and only then to apply the adhesive coating to the individual adhesive tapes. This can be done over the entire surface. In general, however, such a procedure can work in such a way that a stripe coating of the adhesive is applied to the individual adhesive tapes cut with the aid of the laser unit. In this context, it has proved useful to use a hot-melt adhesive or hot-melt pressure-sensitive adhesive based on acrylate as the adhesive. In this case, the coating may be applied with a correspondingly narrow nozzle as a stripe coating to the adhesive tape in question. In principle, a mask can also be used to apply the hot-melt pressure-sensitive adhesive as a stripe to the previously cut adhesive tape.

In principle, any textile is suitable for the substrate band, for example nonwovens, woven fabrics, knitted fabrics or mixed forms. A fabric substrate is usually used at this point. Conceivable here, for example, are PA (polyamide) fabrics, PET (polyethylene terephthalate) fabric, etc. The substrate band typically uses synthetic fibers. In this way, the laser cuts are lint-free. This is because during cutting by the laser unit, there is a temporary melting of the plastic fibers in the area of the cut, thus making clean and lint-free cuts.

This is particularly true when working with a laser unit that emits in the infrared range. In fact, $CO_2$ lasers, in particular that typically emit at a wavelength of about 10.6 μm, have proven to be effective. Such a wavelength is particularly well accepted by the mostly black substrate bands and easily converted into heat, so that at least partial evaporation of the material and fusion occur in the area of the cuts. The power of the impinging laser unit can be basically and only exemplarily be up to 1 kW or up to 2 kW or even more. Furthermore, the laser unit can be operated continuously or pulsed.

As a rule, each laser unit has a laser source and a beam deflector. In most cases, a controller is also provided. Since according to the invention several laser units are used, a central controller is generally used to control all the laser units together. Each beam deflector in turn ensures that the respective laser beam emanating from the respective laser unit and making the individual adhesive tapes is deflected in the respective longitudinal strip in the longitudinal direction to make several cuts of predetermined length. The beam deflector regularly creates parallel cuts of the same length in the respective longitudinal strip. This means that the longitudinal strip can be divided into individual zones. The individual zones are defined by the parallel cuts of equal length. In this context, the procedure is then usually such that the number of cuts in the relevant zone determines the number of adhesive tapes in the longitudinal strip.

In order to be able to make adhesive tapes of different lengths, the beam deflector ensures that the parallel cuts of a given length in the respective zones are connected to each other in the machine direction. This means that the beam deflector is first used to subdivide the zones into the longitudinal strips. These strips then receive the parallel cuts of a given length. This length may be, for example, 50 mm or 100 mm or even more.

Since adhesive tapes usually have a length of several meters, the beam deflector now ensures that the individual zones abut one another. For this purpose, the parallel cuts of a given length are produced by the beam deflector, one after the other in the machine direction. This is generally done in such a way that the parallel cuts abut each other without offset. However, it is also possible in principle for the parallel cuts to be offset transversely from each other. This is the way to proceed, for example, if the width of the adhesive tape to be produced is to be changed during a production run.

In addition, the procedure is generally such that the speed of the substrate band and that of the beam deflector are matched to each other. In order to detect the speed of the substrate band, a speed sensor can be associated with the substrate band supplied by the supply unit. This speed sensor may be a friction roller, i.e. a roller applied to the surface of the substrate band that is rotated by movement of the substrate band in the machine direction. Rotation of the roller corresponds to a speed signal that is processed by the central controller and synchronized with the speed of the beam deflector.

Alternatively or additionally, however, it is also conceivable that the substrate band is provided with, for example, regularly spaced marks that are detected by the speed measurement sensor and correspond to a corresponding speed signal when the substrate band passes in the machine direction. In this case, too, the signal from the sensor is processed by the central controller, compared with this speed, and used for synchronizing the speed of the beam deflector.

The synchronization of the speed of the substrate band on the one hand with that of the beam deflector on the other hand is effected by the central controller in such a way that the beam deflector, for example, moves at the speed of the substrate band in the machine direction. This speed may be several multiples of 10 m/min, for example up to 60 m/min or even more. In any case, it is necessary that, for example, with a speed of the substrate band in the machine direction of 50 m/min, the beam deflector is or can be controlled at such a speed that, in the example, the ten cuts in the associated longitudinal strip can also be produced in each case from zone to zone. This presupposes that each individual cut is produced by the deflection unit at at least ten times the speed of the substrate band, because the beam deflector ensures that the laser beam jumps from cut to cut within the longitudinal strip.

For this purpose, the beam deflector is usually equipped with at least two deflection mirrors that can be pivoted in two mutually perpendicular planes. In addition, a so-called galvanometer scanner is usually used to pivot the relevant deflection mirror. As a result, the beam deflector is typically designed as a three-axis galvanometer scanner, thus enabling cutting especially in the plane and in practically any longitudinal and transverse direction. The longitudinal direction coincides with the machine direction, while the transverse direction is transverse thereto. It is also an object of the invention to provide an associated apparatus as described in claim 12 et seq.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION OF THE INVENTION

Figure 1A:
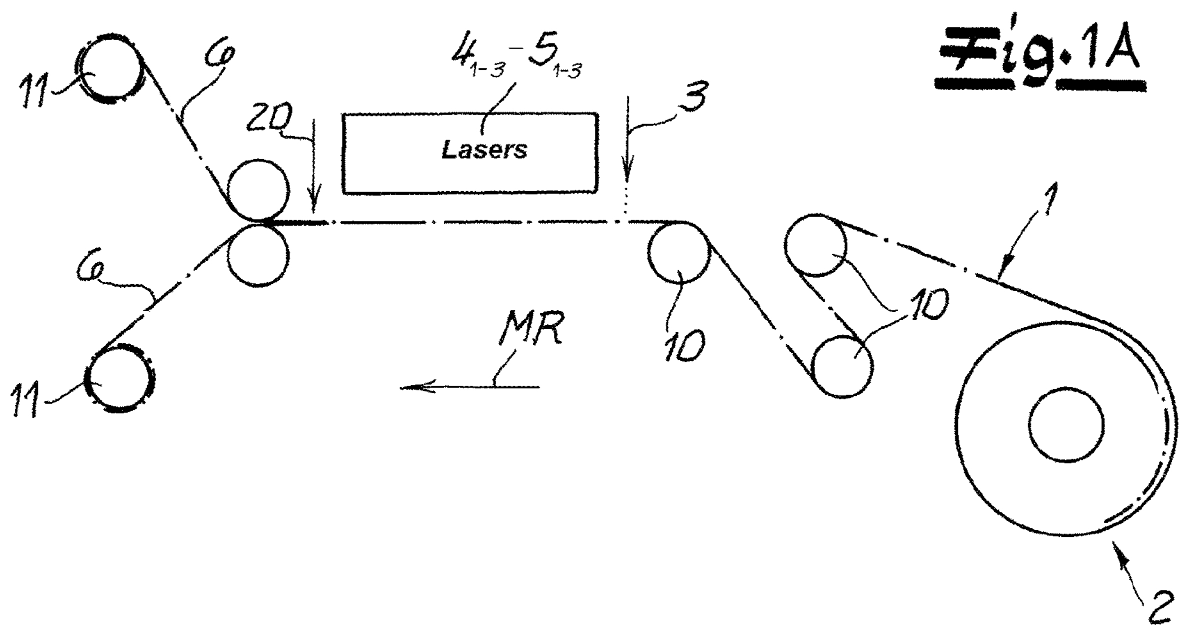
FIG. 1A is a schematic view of the apparatus according to the invention for making adhesive tape.
Figure 1B:
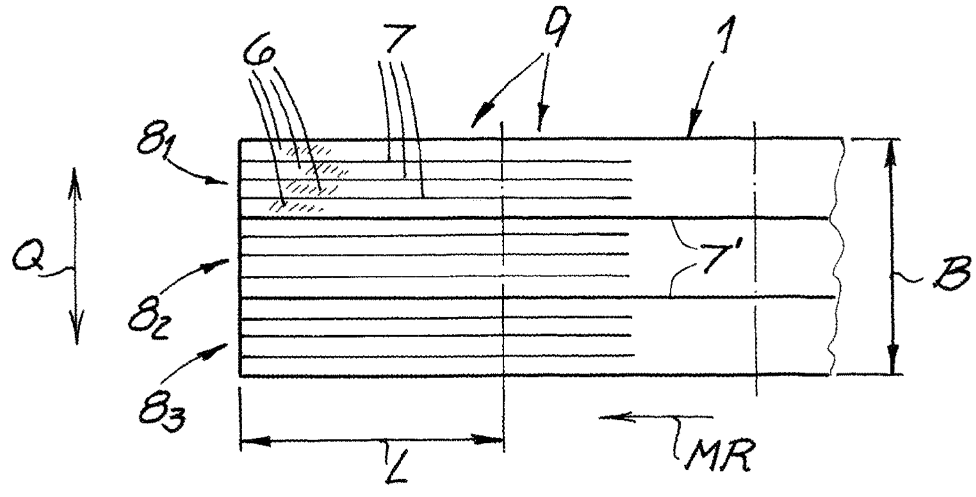
FIG. 1B is a top view of the substrate band.

As seen in FIG. 1, a substrate band 1 is fed from a supply roll 2 in a machine direction MR that coincides with the longitudinal extent of the substrate band 1. The substrate band 1 is specifically a fabric, for example a PA web. It is provided with an adhesive coating over all of one of its faces.

The prefabricated substrate band 1 is now cut in the machine direction MR with the aid of laser units 4, 5 in the longitudinal or machine direction MR to form individual adhesive tapes 6 that can be seen at the downstream end. For this purpose, the laser units 4, 5 form cuts 7 and 7' in the substrate band extending in the longitudinal or machine direction MR, as can be seen from the top view of the substrate band 1.

According to the invention, several laser units 4, 5 are used. To distinguish the laser units 4, 5 they are each identified individually at $\mathbf{4}_1$, $\mathbf{5}_1$; $\mathbf{4}_2$, $\mathbf{5}_2$; and $\mathbf{4}_3$, $\mathbf{5}_3$. This can be seen from FIGS. 2 and 3. The several laser units 4, 5 or $\mathbf{4}_1$, $\mathbf{5}_1$; $\mathbf{4}_2$, $\mathbf{5}_2$; and $\mathbf{4}_3$, $\mathbf{5}_3$ now ensure that the substrate band is transversely subdivided at the cuts 7 into longitudinal strips $\mathbf{8}_1$, $\mathbf{8}_2$, and $\mathbf{8}_3$. The overall design is such that the laser unit $\mathbf{4}_1$, $\mathbf{5}_1$ forms the longitudinal strip $\mathbf{8}_1$, the laser unit $\mathbf{4}_2$, $\mathbf{5}_2$ forms the longitudinal strip $\mathbf{8}_2$, and the laser unit $\mathbf{4}_3$, $\mathbf{5}_3$ forms the longitudinal strip $\mathbf{8}_3$.

The longitudinal strips $\mathbf{8}_1$, $\mathbf{8}_2$, and $\mathbf{8}_3$ each extend longitudinally of the substrate band 1, that is in the machine direction MR. Furthermore, it can be seen that the individual longitudinal strips $\mathbf{8}_1$, $\mathbf{8}_2$, and $\mathbf{8}_3$ are transversely subdivided in the zone 9 extending in the longitudinal or machine direction MR by the cuts 7'.

The individual longitudinal strips $\mathbf{8}_1$, $\mathbf{8}_2$, and $\mathbf{8}_3$ abut one another transversely without spacing and, taken together, extend over the entire width B of the substrate band 1. This width B of the substrate band 1 can be between several centimeters and up to 1 m or even more. In fact, the substrate band 1 is fed from the supply unit 2 that is designed as a drum to the laser unit 4, 5 or the several laser units $\mathbf{4}_1$, $\mathbf{5}_1$; $\mathbf{4}_2$, $\mathbf{5}_2$, and $\mathbf{4}_3$, $\mathbf{5}_3$, via deflection rollers 10. After the laser units $\mathbf{4}_1$, $\mathbf{5}_1$; $\mathbf{4}_2$, $\mathbf{5}_2$; and $\mathbf{5}_3$, $\mathbf{4}_3$ have been used to form longitudinal cuts 7 in the substrate band 1, the adhesive tapes 6 made in this way are separated and wound up on respective take-up reels 11 and, for example, made up into spiral adhesive tape rolls.

Several adhesive tapes 6 are thus formed in each of the three longitudinal strips $\mathbf{8}_1$, $\mathbf{8}_2$ and $\mathbf{8}_3$ with the aid of the associated laser unit $\mathbf{4}_1$, $\mathbf{5}_1$; $\mathbf{4}_2$, $\mathbf{5}_2$; and $\mathbf{4}_3$, $\mathbf{5}_3$. According to this embodiment, the laser unit $\mathbf{4}_1$, $\mathbf{5}_1$ forms three cuts 7 in the longitudinal strip $\mathbf{8}_1$, making in this way and at the output end a total of four strip-shaped adhesive tapes 6 from the longitudinal strip $\mathbf{8}_1$ of the substrate band 1. A similar procedure can be followed for the other longitudinal strips $\mathbf{8}_2$ and $\mathbf{8}_3$. However, it is also possible for the laser unit $\mathbf{4}_2$ and $\mathbf{5}_2$ to make a different number of cuts 7 in the respective longitudinal strip $\mathbf{8}_2$, so that this also results in a different number of adhesive tapes 6 at the output end compared to the longitudinal strip $\mathbf{8}_1$. This is not shown in detail. This means that the adhesive tapes 6 produced in the respective longitudinal strips $\mathbf{8}_1$, $\mathbf{8}_2$ and $\mathbf{8}_3$ are cut with respective different widths. In addition, the design is such that the substrate band is divided by the cuts 7' in a transverse direction Q perpendicular to the machine or longitudinal direction MR into the longitudinal strips $\mathbf{8}_1$, $\mathbf{8}_2$, and $\mathbf{8}_3$ all of the same width.

Figures 2, 3:
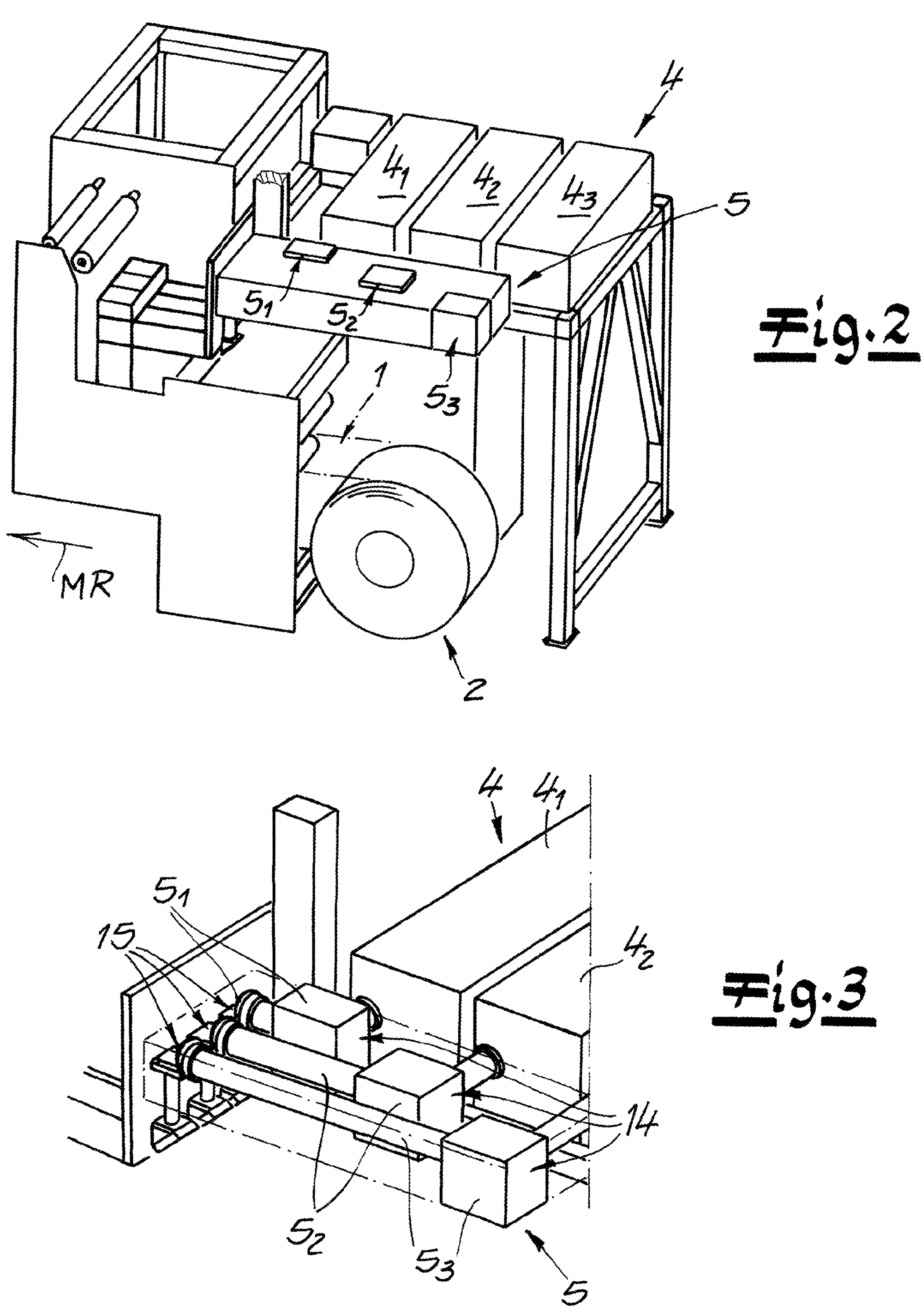
FIG. 2 is an enlarged perspective view of the apparatus according to the invention.
FIG. 3 is a section through the apparatus of FIG. 2 in the area of the laser units.

FIGS. 2 and 3 show that the three laser units $\mathbf{4}_1$, $\mathbf{5}_1$; $\mathbf{4}_2$, $\mathbf{5}_2$; and $\mathbf{4}_3$, $\mathbf{5}_3$ comprise respective laser sources $\mathbf{4}_1$, $\mathbf{4}_2$, and $\mathbf{4}_3$ and respective beam deflectors $\mathbf{5}_1$, $\mathbf{5}_2$, and $\mathbf{5}_3$. The laser sources $\mathbf{4}_1$, $\mathbf{4}_2$, and $\mathbf{4}_3$ are spaced transversely to the machine direction MR. The beam deflectors $\mathbf{5}_1$, $\mathbf{5}_2$, $\mathbf{5}_3$, each deflect a respective laser beam 12 emitted by the respective laser source $\mathbf{4}_1$, $\mathbf{4}_2$, and $\mathbf{4}_3$ and shown in particular in FIG. 4 to create the individual adhesive tapes in the respective longitudinal segment $\mathbf{8}_1$, $\mathbf{8}_2$, or $\mathbf{8}_3$ each extending longitudinally to make the individual cuts 7 of predetermined length L. In fact, the design is such that the beam deflectors $\mathbf{5}_1$, $\mathbf{5}_2$, and $\mathbf{5}_3$ make the cuts 7 in the respective longitudinal strips $\mathbf{8}_1$, $\mathbf{8}_2$, and $\mathbf{8}_3$ of the predetermined length L in the zone 9.

In fact, the cuts 7 in the zone 9 consequently may have the length L of, for example, 50 mm to 100 mm or even more. After the laser unit $\mathbf{4}_1$, $\mathbf{5}_1$ has created the first cut 7 in the longitudinal strip $\mathbf{8}_1$, the laser beam 12 jumps to the second cut 7 and creates it with the same length L until, according to this embodiment, all three cuts 7 have been produced in the longitudinal strip $\mathbf{8}_1$ at the section 9 and with the length L. This means that the beam deflector 5 or the laser unit 4 in general produces parallel cuts of the same length L in the respective longitudinal strips $\mathbf{8}_1$, $\mathbf{8}_2$, and $\mathbf{8}_3$. The number of cuts 7 determines the number of tapes 6 at the output end. In addition, the design is such that the laser unit 4, 5 or the beam deflector 5 creates the parallel cuts 7 of the specified length L adjacent to each other in the machine direction MR in the respective longitudinal strip $\mathbf{8}_1$, $\mathbf{8}_2$ and $\mathbf{8}_3$. The speed of the beam deflector must be at least be three times the speed of the substrate band 1.

In order to now provide a total of the strip-shaped adhesive tapes 6 with a length of several meters on the output end in this embodiment and according to the design, the parallel cuts 7 are connected longitudinally to each other without any offset. This means that as soon as the laser unit $\mathbf{4}_1$, $\mathbf{5}_1$ in the first section 9 of the longitudinal strip $\mathbf{8}_1$ has produced the three cuts 7 with the length L provided and shown in the example, the overall feed of the strip-shaped cut 7 ensures that the three parallel cuts 7 are aligned with each other without offset in the machine direction MR so that the cuts in the longitudinal strip $\mathbf{8}_1$ can then be produced in the following section 9. The parallel cuts 7 adjoin each other without offset. In addition, the design is such that the speed of the substrate band 1 and that of the beam deflector $\mathbf{5}_1$ are conformed to each other in the example of the longitudinal strip $\mathbf{8}_1$. A central controller 13 takes care of the synchronization. For this purpose, the central controller 13 receives signals from a sensor 20 that detects the travel speed of the substrate band 1 and transmits it to the central controller 13. In addition, the central controller 13 is connected to each of the individual laser units $\mathbf{4}_1$, $\mathbf{5}_1$; $\mathbf{4}_2$, $\mathbf{5}_2$ and $\mathbf{4}_3$, $\mathbf{5}_3$ in order to control them accordingly so that with their aid the longitudinal cuts 7 can be produced in the respective section 9 of the corresponding longitudinal strips $\mathbf{8}_1$, $\mathbf{8}_2$, and $\mathbf{8}_3$. Not expressly shown is the further possibility that, the central controller 13 operates a drive for the substrate band 1 for setting its speed in the machine direction MR as a function of the signals from the sensor 20.

Figure 4:
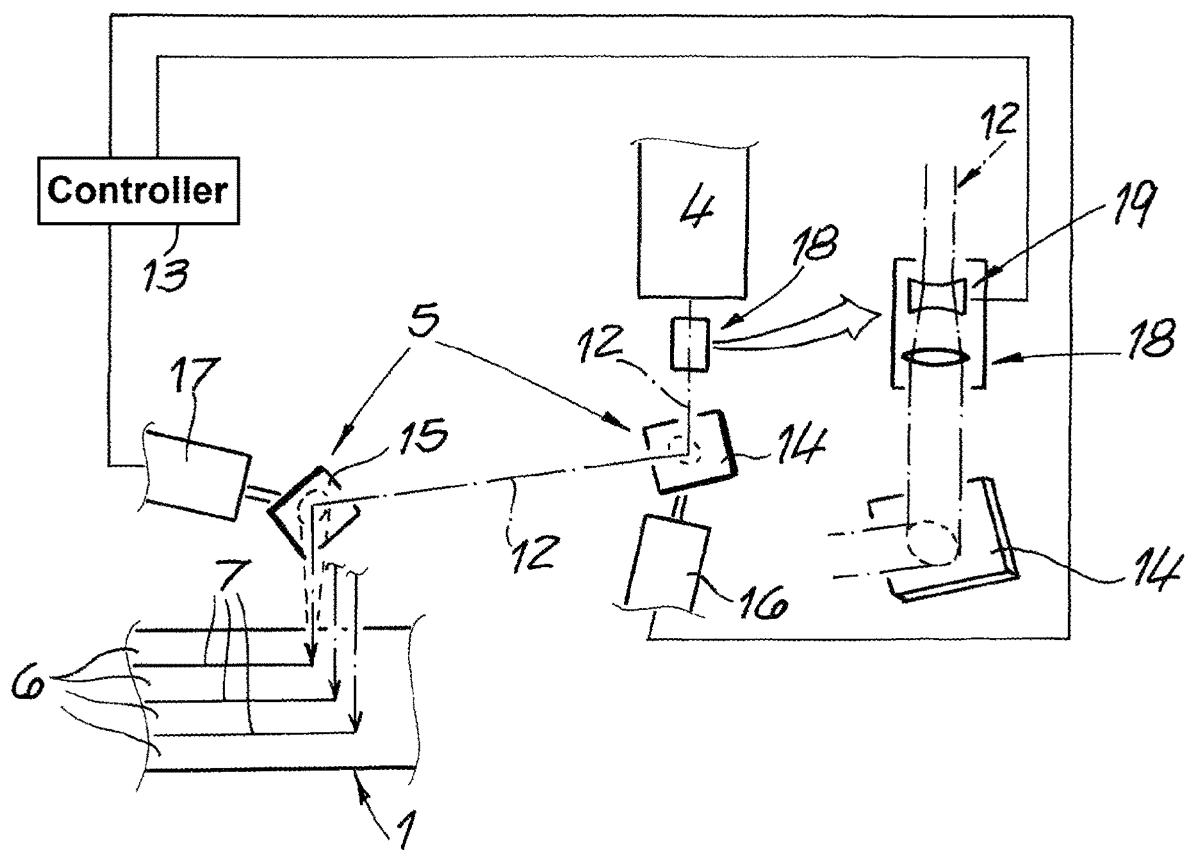
FIG. 4 is a schematic detail view of the beam deflector.

The detailed view of FIG. 4 shows that the beam deflector is equipped with at least two deflection mirrors 14, 15. These two deflection mirrors 14, 15 can be pivoted in two mutually perpendicular planes. For this purpose, each deflection mirror 14 is equipped with a respective galvanometer scanner 16, 17 that in turn is controlled and actuated with the aid of the central controller 13.

FIG. 4 also shows that the laser beam 12 is focused on the plane of the substrate band 1. For this purpose spreader optics 18 are provided that refocus the laser beam 12. The spreader optics 18 has a lens 19 that can be moved by a drive parallel to the laser beam 12. The lens 19 is, like the galvanometric scanners 16, 27, operated by the controller 13.

In addition to changing the focus of the laser beam 12 with the aid of the controller 13, the latter is finally also capable of correcting the position of the substrate band 1 in the transverse direction Q. For this purpose, for example, individual or all of the deflection rollers 10 (as well as the supply unit 2, if applicable) can be moved in their longitudinal direction and thus in the transverse direction Q with the aid of the controller 13, if necessary, in order to ensure that the individual cuts 7 actually connect to each other from section 9 to section 9 without offset. Not shown is the option of cooling the beam deflector 5 in each case with water, for example, in order to achieve maximum positional stability of the deflection mirrors 14,15. Also not shown is the option of the central controller 13 being connected to a higher-level network, for example the Internet, in order in this way to facilitate remote monitoring or to import programs from outside for controlling the respective laser unit 4, 5.

We claim:

1. A method of making adhesive tape, the method comprising the steps of:

advancing a substrate band longitudinally in a longitudinal machine direction from a supply past a plurality of laser units spaced transversely to the machine direction and each having a respective stationary laser generating a respective beam and a respective movable beam deflector movable to deflect the respective beam from the respective laser both transversely and longitudinally relative to the machine direction;

continuously monitoring and determining a travel speed of the band in the machine direction;

cutting the band longitudinally with the laser units into a plurality of longitudinal strips extending in the machine direction;

cutting each of the longitudinal strips longitudinally into a plurality of tapes by moving the deflectors synchronously relative to the travel speed;

applying an adhesive to a face of each of the tapes; and winding the tapes up individually.

2. The method according to claim 1, wherein the longitudinal strips abut one another transversely without spacing and extend over an entire width of the substrate band.

3. The method according to claim 1, wherein a respective laser unit is assigned to each of the longitudinal strips and cuts same into the tapes.

4. The method according to claim 3, wherein the tapes of each longitudinal strips are all laser cut to a predetermined width.

5. The method according to claim 1, wherein each of the longitudinal strips is cut into tapes of a predetermined width.

6. The method according to claim 1, wherein each beam deflector is deflected to make parallel longitudinal cuts of a predetermined longitudinal length in the respective longitudinal strip.

7. The method according to claim 6, wherein a number of the longitudinal cuts determines a number of tapes in the respective longitudinal strip.

8. The method according to claim 1, wherein the longitudinal cuts extend in the machine direction adjacent one another.

9. The method according to claim 8, wherein the band is subdivided into longitudinally succeeding zones that extend continuously without transverse offset from each zone to the longitudinally adjacent zones.

10. The method according to claim 1, wherein each stationary laser of each laser unit is fixed laterally adjacent to and offset relative to the longitudinal machine direction from the advancing substrate band and the respective beam deflectors are transversely spaced from each other relative to the longitudinal machine direction and juxtaposed transversely of the longitudinal machine direction with the band.

11. The method according to claim 10, wherein the deflectors are spaced transversely of the machine direction from one another.

12. The method according to claim 10 wherein the deflectors are also spaced longitudinally in the longitudinal machine direction from one another.

13. The method according to claim 1, wherein each deflector has a pair of mirrors deflectable in mutually perpendicular planes in accordance with the detected speed of the advancing band.

* * * * *